Dec. 29, 1964 L. R. HAGNER ETAL 3,163,146

APPARATUS FOR CLAMPING AN ARTICLE

Filed Jan. 12, 1962 3 Sheets-Sheet 1

INVENTORS
L. R. HAGNER
R. J. HORN
BY J. L. Landis
ATTORNEY

Dec. 29, 1964 L. R. HAGNER ETAL 3,163,146

APPARATUS FOR CLAMPING AN ARTICLE

Filed Jan. 12, 1962

3 Sheets-Sheet 2

INVENTORS
L. R. HAGNER
R. J. HORN

BY D. L. Landis
ATTORNEY

APPARATUS FOR CLAMPING AN ARTICLE

Filed Jan. 12, 1962

INVENTORS
L. R. HAGNER
R. J. HORN

BY J. L. Landis
ATTORNEY

United States Patent Office 3,163,146
Patented Dec. 29, 1964

3,163,146

APPARATUS FOR CLAMPING AN ARTICLE

Lawrence R. Hagner, Cicero, and Russell J. Horn, Chicago, Ill., assignors to Western Electric Company, Incorporated, New York, N.Y., a corporation of New York Filed Jan. 12, 1962, Ser. No. 165,821
8 Claims. (Cl. 113—126)

The present invention relates generally to apparatus for clamping an article having a planar peripheral edge, and more particularly to clamping a flat rectangular article by all four of its edges so that the major portion of one side is exposed for a subsequent operation. Accordingly, the general objects of the invention are to provide new and improved apparatus of such character.

There are many industrial applications, particularly coating processes, in which it is required that articles of the above-mentioned type be clamped by their edges such that the remaining portions of the articles are exposed for subsequent operations. Particularly where the subsequent operations involve liquid coating and the application of heat to the article, as in solder-wave coating, it is important that the article be clamped firmly at all points around the peripheral edge so that warpage is inhibited.

Accordingly, another object of the invention is to provide new and improved apparatus for clamping an article of the class described firmly at all points around the peripheral edge such that the remaining portions of the article are exposed for a coating operation involving heat and warpage is inhibited.

In the specific field of tinning printed wiring boards to connect electrically components mounted on the upper surface of the board with leads extending through the board to the under surface thereof, any clamp utilized for holding the boards must satisfy additional criteria. Because the components are inserted on the upper surface of the board prior to the tinning operation, it is necessary that the top portion of the clamp be designed such that the board is clamped firmly without damaging the components. To facilitate the use of a rotary conveyor, the clamp must be so constructed and arranged as to hold the board horizontally so that a solder wave may impinge on the under surface of the board and be entered and departed from in a manner that will enable the solder wave to stabilize before the printed wiring board enters the crest thereof. Such a clamp is required to pass the boards sequentially over a flux pot, a heat bank, and a solder wave and therefore must be protected against warpage due to the intense heat. In addition, the clamp must not obstruct the crest of the solder fountain from reaching the under surface of the printed wiring board, and must be sufficiently nonconductive so as not to conduct heat away from the solder wave. It is further desirable to provide a clamp which can be latched, but which will spring open and force the boards sufficiently out of the clamp, when unlatched, so as to permit ready extraction of the board from the clamp.

Therefore, further objects of the invention are to provide new and improved apparatus for clamping printed wiring boards to be sequentially exposed to a flux pot, a heat bank, and a solder fountain that will satisfy the above-mentioned requisites and desirable characteristics.

With the foregoing and other objects in mind, apparatus in accordance with certain aspects of the invention includes a base having a recess therethrough with inwardly extending shoulders at the bottom of the recess for receiving and supporting an article to be clamped by a peripheral edge thereof. The peripheral edge of the article is clamped against the shoulder by a clamping member, which is pivoted toward the recess to a closed position where portions of the clamping member enter the recess to clamp the peripheral edge of the article against the shoulders. With this arrangement, the article is clamped with the main portion of the side away from the clamping member exposed for subsequent operations such as solder-wave coating.

In the case where the article to be clamped is rectangular and flat, such as the usual printed wiring boards, the recess in the base is rectangular. In addition, the clamping member includes a pivoted, three-sided frame for clamping three of the four edges, and a linearly movable bar member mounted between the sides of the frame for clamping the remaining edge. Linear movement of the bar member is initiated by the pivotal movement of the frame member. Preferably, a mechanism is provided for latching the frame to the base mechanism, for biasing the frame away from the base to an open position, and a resilient mechanism for urging the front edge of the article out of the recess when the latching mechanism is released so as to permit ready extraction of the article from the clamping apparatus.

Other objects, advantages, and aspects of the invention will appear from the following detailed description of a specific embodiment thereof, when taken in conjunction with appended drawings, in which.

Figure 1:
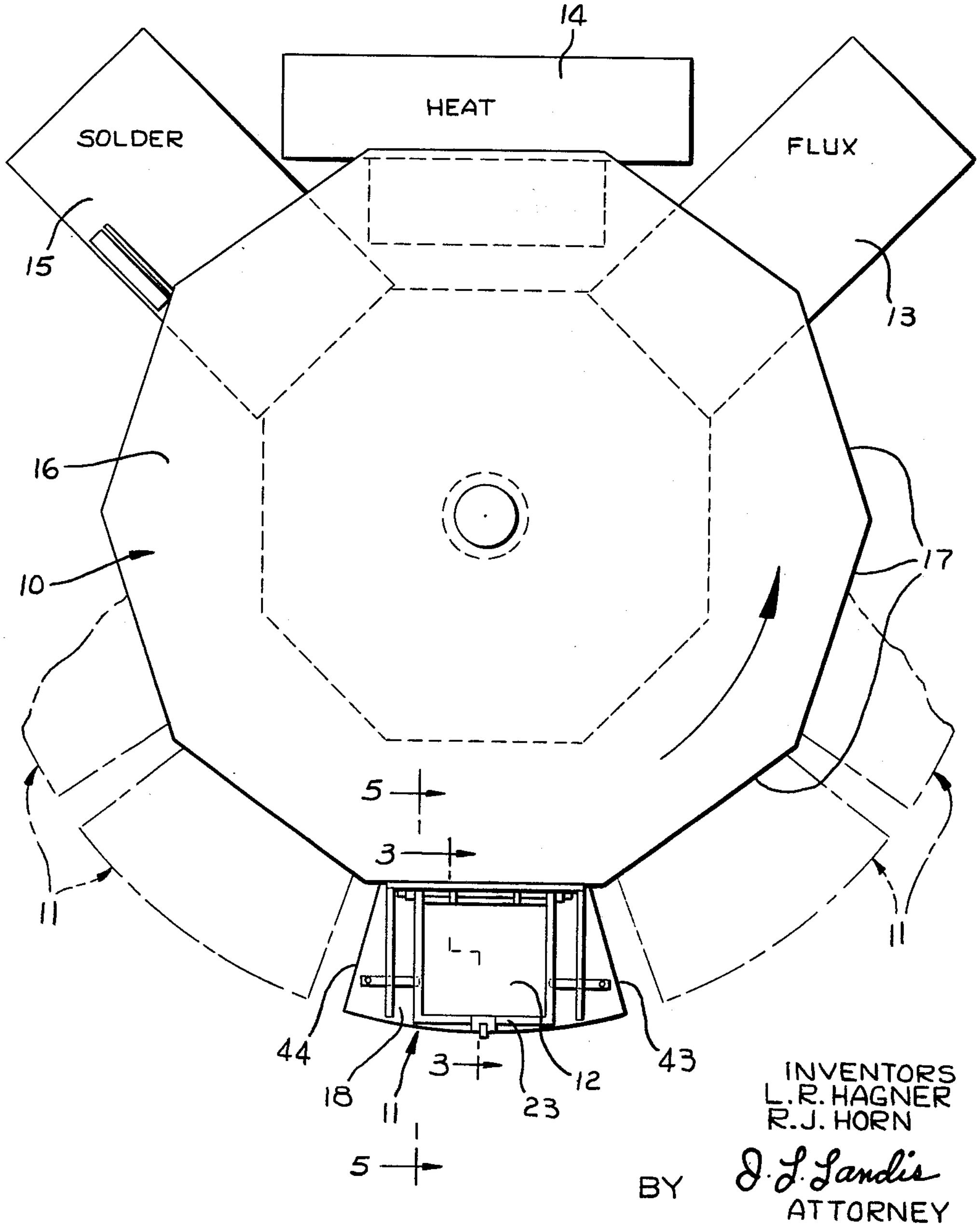
FIG. 1 is a plan view of a rotary table to which a clamp constituting a specific embodiment of the invention is mounted for passing printed wiring boards sequentially over solder-wave equipment.

Referring now in detail to the drawings, particularly to FIG. 1, there is illustrated a rotary conveyor 10 with specially designed clamps designated generally by the numeral 11 for continuously carrying a succession of printed wiring boards 12—12, having components mounted on the upper surface of the board with leads extending through the board to the under surface thereof, sequentially over a flux pot 13, a heat bank 14, and a solder fountain 15. The rotary conveyor 10 is composed of a suitably driven, ten-sided polygonal table 16 rotating horizontally about its centroidal axis at a constant speed. Each side 17 of the conveyor 10 is provided with a clamp 11 horizontally disposed below the table 16 for holding a printed wiring board 12 with its under surface exposed to the soldering equipment. The speed of conveyor rotation is calculated to be sufficiently slow as to enable the printed wiring pattern to be properly tinned, which speed in this instance is ½ r.p.m. or a linear velocity of 6 ft./min. for the board 12.

Figure 2:
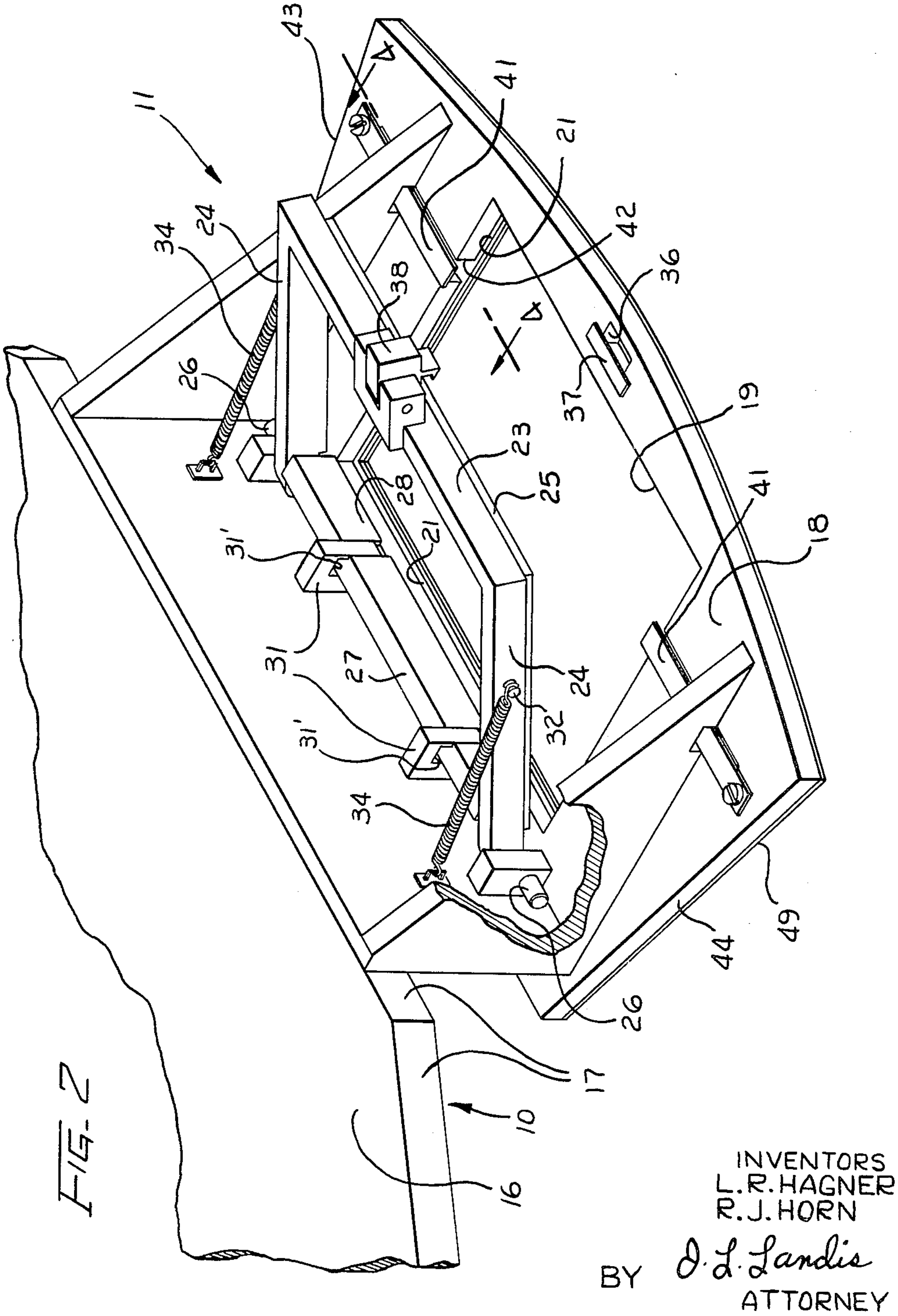
FIG. 2 is an enlarged perspective view of the clamp in an open position, with portions broken away to reveal details of construction.
Figures 3, 4:
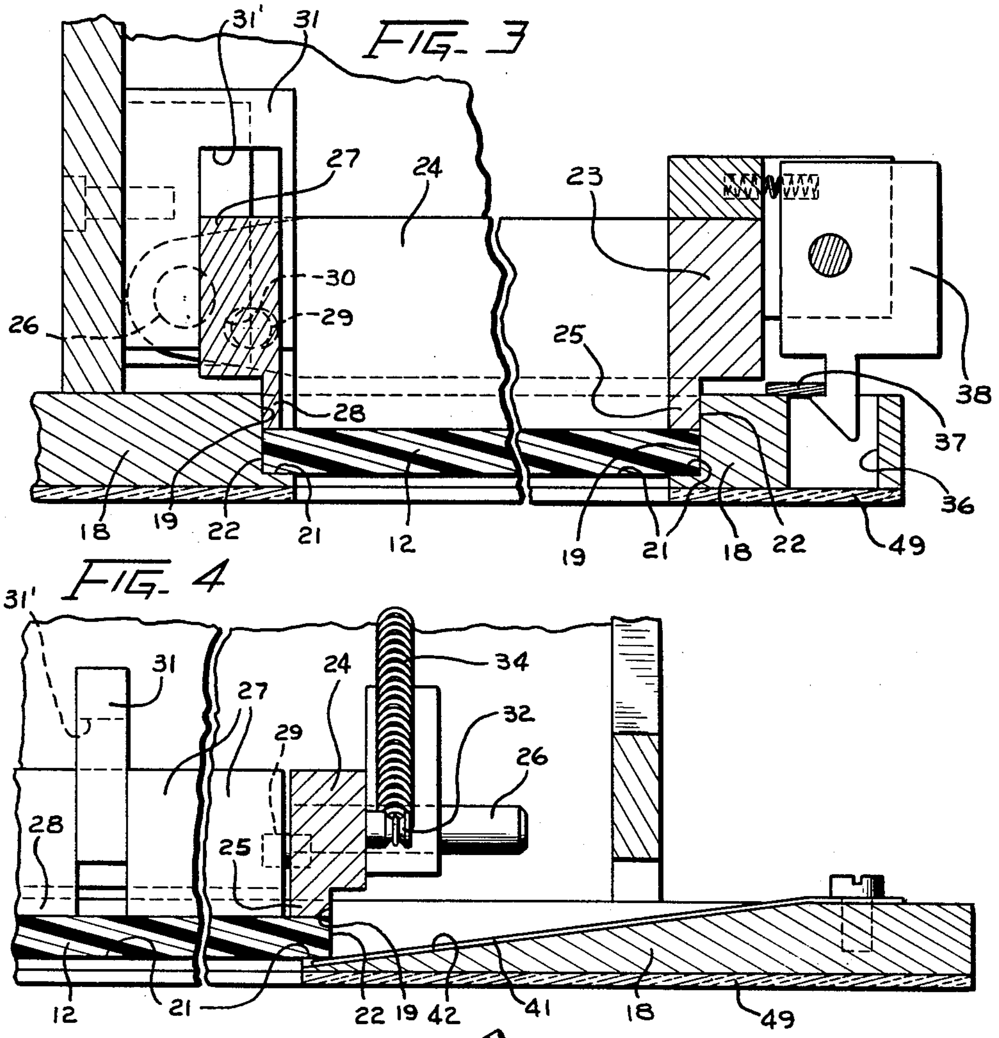
FIG. 3 is an enlarged sectional view of the clamp, taken generally along the line 3—3 in FIG. 1.
FIG. 4 is an enlarged fragmentary sectional view taken generally along the line 4—4 in FIG. 2.

The clamp 11 is shown in more detail in FIG. 2, and includes a base 18 having a rectangular recess 19 extending vertically therethrough and inwardly extending shoulders 21—21 formed at the bottom of the recess 19 for receiving and supporting the printed wiring board 12 at all four of its edges 22—22, as illustrated in FIGS. 3 and 4. A three-sided rectangular frame 23 is pivotably mounted at the rear of its sides 24—24 by pins 26—26 to the base 18 such that a depending foot 25 extending around the inside periphery of the frame 23 is accommodated within the recess 19 and completely overlies the corresponding peripheral shoulders 21—21 thereof when the frame is pivoted downward to a closed position.

In order to form a rectangular clamping member which will overlie all of the peripheral shoulders 21—21, but not the components, an independent bar member 27 is mounted on the base 18 between the sides 24—24 of the frame 23. The manner in which the independent member 27 is mounted to the sides 24—24 is quite critical because a depending foot 28 along the innermost side of the bar member 27 must fit into the recess 19 and overlie the rearmost shoulder 21. If the member 27 were rigidly attached to the sides 24—24, it would be constrained to the pivotal movement of the frame 23, which pivotal movement would gouge out a portion of the board 12 and would not permit the depending foot 28 of the member 27 to clear the back side of the recess 19 and still overlie the rearmost peripheral shoulder 21 when the frame 23 is pivoted downward.

To overcome this problem, the independent bar member 27 is coupled to the sides 24—24 by a pair of pins 29—29, one at either end of the member 27, which are slidably received in horizontally elongated slots 30—30 (FIG. 5) in the sides 24—24. The elongated length of the slots 30—30 permit them to slide forward and back relative to the pins 29—29 as the frame 23 pivots. Capitalizing on this limited sliding movement, a pair of guides 31—31, mounted to the base 18 at the rear of the recess 19 and having vertical grooves 31′—31′ for slidably receiving the member 27, constrain the member 27 to movement in a vertical direction only. Thus, as the frame 23 is pivoted downward, the bar member 27 is forced by the guides 31—31 to descend in vertical alignment above the rearmost shoulder 21, the slots 30—30 sliding back relative to the pins 29—29 to make possible the constrained vertical movement of the member 27 in the grooves 31′—31′ and the board 12 is firmly clamped without damaging the components thereon.

Figure 5:
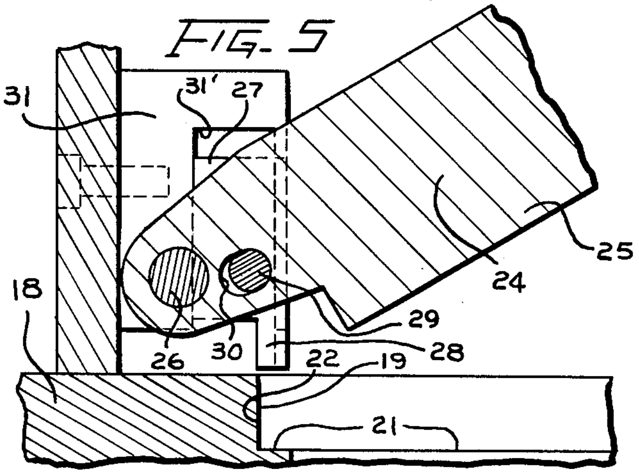
FIG. 5 is an enlarged fragmentary sectional view taken generally along the line 5—5 in FIG. 1 and showing the clamp in open position.

The frame 23 is further provided with a pair of dowel-like extensions 32—32, one on either side 24 and near the front edge of the frame 23, to each of which one end of an extension spring 34 is fastened, the other end of each spring 34 being anchored to the base 18. The springs 34—34 are designed with sufficient tension to bias the frame 23 pivotally upward from the base 18 through a substantial arc to an open position, as depicted in FIGS. 2 and 5.

The base 18 is provided with a slot 36 having a catch 37 for receiving and engaging a spring latch 38 extending downwardly from the front edge of the frame 23, to lock the same to the base 18 as shown in FIG. 3. A pair of leaf springs 41—41 mounted on the top surface of the base 18 extend horizontally toward the recess 19, one on either side and near the front, to positions above and co-extensive with respect to the inner edges of the shoulders 21—21. The springs 41—41 resist the downward motion of the front edge of the board 12 into the recess 19 when the rear edge of the board 12 is received and supported on the rear shoulder 21. A pair of slots 42—42 tapered outwardly from the recess 19, as shown in FIG. 4, permit deformation of the leaf springs 41—41 as the frame 23 is lowered to clamp the board 12, thus allowing all four edges of the board 12 to seat uniformly on the shoulders 21—21.

To facilitate utilization of the rotary conveyor 10 for exposing wiring circuit boards 12—12 to solder-wave equipment, the leading and trailing edges 43 and 44 (FIG. 1) of the base 18, in the direction of conveyor rotation, are radial with respect to the center of rotation so that the solder wave, which is also radially disposed, will be entered and departed from concurrently by all points on the leading and trailing edges 43 and 44 respectively, thus enabling the solder wave to stabilize before the board 12 enters it.

In addition to the particular construction of the base 18, the solder wave is preferably of a special construction in order to facilitate utilization of the rotary conveyor 10. The particular construction requisite is a flat, unidirectional wave flowing contrary to the drection of conveyor rotation. This construction is accomplished by fitting a curved deflector blade on the remote side (in the direction of conveyor rotation) of a conventional solder wave nozzle. Such a solder wave has a characteristic wiping action against the bottom of the wiring board 12 which tends to wipe off discontinuities and icicle formations, leaving a uniform coat of solder over the circuit pattern despite the unequal exposure times of parts thereof because of rotational motion.

To prevent conduction of heat from the solder wave and subsequent warping of the clamp 11 as a consequence thereof, the bottom of the base 18 is coated with a layer of heat-insulating asbestos 49 (FIG. 4). The base 18 is further designed such that the shoulders 21—21 are no more than one-eighth of an inch in thickness, measuring from the undersurface of the asbestos coating on the bottom of the base 18, so as to permit the solder wave 46 to reach up into the cavity defined by the under surface of the board 12 and the shoulders 21—21, and thereby tin the printed wiring pattern and electrically connect the leads of the components extending through the board 12.

*Operation*

The insertion of a printed wiring board 12 into the clamp 11 is initiated by placing the rear edge of a board 12 on the rear shoulder 21 in the recess 19 and resting the front portion of the board on the leaf springs 41—41. The frame 23 is then pivoted down against the tension of the springs 34—34 to the closed position, the independent bar member 27 being constrained to vertical descent, as described hereinabove, to contact the board 12 and press it downward into the recess 19 so that its four edges 22—22 are firmly clamped against the supporting shoulders 21—21 without damaging the components on the upper surface of the board, the leaf springs 41—41 deforming into the tapered slots 42—42 to permit the edges of the board to seat uniformly on the shoulders. With the board 12 so clamped, the spring loaded latch 38 locks the frame 23 to the base 18, thus clamping the board 12 securely at all four edges to prevent it from warping when heated.

After the board 12 has passed over the operating devices, the latch 38 is manually released, which allows the springs 34—34 to force the frame 23 pivotally upward to its open position. The deformed leaf springs 41—41, now free to spring back to their initial position, force the front edge of the board 12 out of the recess 19 and thereby allow the board 12 to be easily extracted from the clamp 11.

While one specific embodiment of the invention has been described in detail hereinabove, it will be obvious that various modifications may be made without departing from the spirit and scope of the invention.

What is claimed is:

1. Apparatus for clamping an article having a planar peripheral edge, substantially continuously around such edge with a major portion of at least one side of the article exposed for a subsequent operation, which comprises:

a base having a recess therethrough generally similar in configuration to and larger than the planar perimeter of the article, and a substantially continuous shoulder extending inwardly all around a bottom end of the recess for supporting the planar peripheral edge of the article, the article being inserted into the recess with the side to be exposed facing the shoulder; and a clamping member mounted on said base and including pivotable elements and a reciprocable element for movement toward and away from the recess, portions of said clamping member being generally similar in configuration to and smaller than the planar perimeter of the article so that such portions may enter the recess in said base and substantially completely overlie the continuous shoulder therein;

whereby an article inserted into the recess in said base may be clamped at all points around its planar peripheral edge against the continuous shoulder when said pivotable elements are pivoted and said reciprocable element is reciprocated toward the recess to a closed position.

2. The apparatus as recited in claim 1, wherein:

the pivotal elements form an open-ended frame and the reciprocable element forms a closure member for said open-ended frame;

said open-ended frame is pivotably mounted on the base at its open end; and means are provided for mounting said closure member on said frame and the base, for reciprocatory movement parallel to the adjacent wall of the recess in response to pivotal movement of said open-ended frame to the closed position, to close the open end of said frame and to clamp the corresponding portion of the planar peripheral edge of the article against the shoulder.

3. Apparatus for clamping a flat rectangular article by all four of its edges so that the major portion of at least one side is exposed for a subsequent operation, which comprises:

a base having a rectangular recess therethrough which is similar to and slightly larger than the perimeter of the article, the base being provided with a substantially continuous inwardly-extending shoulder at the bottom of the recess for supporting the article by all four of its edges, the article being inserted into the recess with the side to be exposed facing the shoulders;

a three-sided frame mounted to said base for pivoting movement toward and away from the recess, portions of said frame facing the recess being similar to and slightly smaller than the recess so that they enter the recess and clamp three of the four edges of the article against the corresponding portions of the shoulder when said frame is pivoted toward the recess to a closed position;

a bar member mounted on said base between the sides of said frame for constrained linear movement toward and away from the remaining shoulder in the recess; and means for coupling said bar member to said frame so that pivoting movement of said frame to the closed position causes linear movement of said bar member into the recess to a closed position where said bar member clamps the remaining edge of the article against the remaining portion of the shoulder.

4. The apparatus as recited in claim 3, wherein releasable means are provided for latching the frame to the base when the frame is pivoted to the closed position to clamp the article firmly by all four of its edges.

5. The apparatus as recited in claim 4, wherein means are provided for biasing the frame pivotally out of the recess through a substantial arc to an open position when the latching means is released; and wherein resilient means are provided for urging the edge of the article remote from the bar member out of the recess when the frame is pivoted to the open position, to permit ready extraction of the article from the clamp after the subsequent operation.

6. The apparatus as recited in claim 5, wherein the resilient means comprises a pair of leaf springs mounted to the base and extending toward the recess to positions above and coextensive with respect to the inner edges of the peripheral shoulder, the base and shoulder being provided with slots into which the springs are forced by the article when the frame is pivoted to the closed position to permit all four edges of the article to be clamped uniformly against the shoulder.

7. The apparatus as recited in claim 3, wherein the means for coupling the bar member to the frame comprises a pair of pins secured to the ends of the bar member and projecting through apertures in the adjacent sides of the frame member, the apertures being oversize in a direction perpendicular to the direction of movement of the bar member to permit sliding movement of said pins therealong and thereby to permit the constrained linear movement of the bar member in response to pivoting movement of the frame.

8. In combination with a horizontal, polygonal rotary conveyor for carrying flat rectangular printed wiring boards sequentially over a solder fountain to tin the printed wiring pattern and electrically connect the components thereon; a clamp depending from each side of the conveyor for holding a printed wiring board horizontally with its under surface exposed to the solder fountain as the conveyor is rotated, which comprises:

a base horizontally disposed below the conveyor and having a rectangular recess extending vertically therethrough with inwardly extending shoulders formed at the bottom of the recess for receiving and supporting the printed wiring board by all four of its edges, said base being so constructed and arranged that (1) the leading and trailing edges thereof in the direction of conveyor rotation are radial with respect to the center of rotation so that the solder wave which is also radially disposed will be entered and departed from concurrently by all points on the leading and trailing edges respectively, (2) the bottom of the base is coated with heat insulating material to prevent conduction of heat from the solder wave, and (3) the shoulders are no more than one-eighth of an inch in thickness from the bottom surface of the asbestos coating so as to permit the solder wave to reach up into the cavity defined by the under surface of the board and the shoulders;

a three-sided frame mounted near the ends of its sides to said base for pivoting movement toward and away from the recess such that a depending foot extending around the entire periphery of said frame facing the recess enters the recess and clamps three of the four edges of the board against the corresponding shoulders when said frame is pivoted downward to a closed position;

an independent bar member mounted on said base between the sides of said frame for constrained vertical movement toward and away from the remaining, rearmost shoulder in the recess;

means for coupling said bar member to the sides of said frame so that pivoting movement of said frame to the closed position causes vertical movement of said bar member into the recess to a closed position where said bar member clamps the remaining edge of the board against the remaining, rearmost shoulder; and releasable means for latching said frame at its forward edge to said base when said frame is pivoted to the closed position to clamp the board firmly by all four of its edges.

References Cited in the file of this patent

UNITED STATES PATENTS

| | | |
|---|---|---|
| 1,718,476 | Messmer | June 25, 1929 |
| 1,748,227 | Hyams | Feb. 25, 1930 |
| 2,467,103 | Wester | Apr. 12, 1949 |
| 2,706,946 | Faeber | Apr. 26, 1955 |
| 2,771,047 | Zimmerman | Nov. 20, 1956 |
| 3,041,991 | Dvorak | July 3, 1962 |
| 3,053,215 | Guty | Sept. 11, 1962 |